Dec. 14, 1937.     O. E. SIMMONDS     2,102,489
SELF LOCKING NUT AND METHOD OF MAKING THE SAME

Filed March 23, 1936

INVENTOR
OLIVER EDWIN SIMMONDS
By Norris & Bateman
ATTORNEYS

Patented Dec. 14, 1937

2,102,489

UNITED STATES PATENT OFFICE 2,102,489

SELF-LOCKING NUT AND METHOD OF MAKING THE SAME

Oliver Edwin Simmonds, London, England, assignor to Simmonds Development Corporation Limited, London, England Application March 23, 1936, Serial No. 70,497
In Great Britain April 16, 1935

9 Claims. (Cl. 10—86)

This invention relates to self-locking nuts and method of making the same of the kind wherein the nut is provided with a cylindrically-shaped recess in which there is retained an inset comprising an annular disc or short tube of elastic material such as vulcanized fibre or a plurality of such annular discs or tubes arranged coaxially and adjacent to one another, the interior diameter of the elastic inset being less than the maximum interior diameter of the screw-threaded portion of the nut, so that, when the nut and screw are screwed together, the threads of the screw are caused to penetrate into the elastic inset, unintentional relative movement between the nut and screw being thereby prevented.

It has already been proposed to provide the wall of the cylindrically-shaped recess of a nut of the kind described, which has a single annular elastic inset that is retained within the recess by a washer over the edge of which the adjacent edge of the nut is clenched, with a plurality of inwardly-extending projections which engage correspondingly-shaped and positioned recesses in the annular elastic inset, thereby to prevent rotation of the elastic inset relatively to the nut.

The present invention has for its object the provision of an improved manufacture of self-locking nuts of the kind referred to in which rotation of the elastic inset relatively to the nut is prevented.

In the improved manufacture of self-locking nuts of the above kind according to the invention, there is formed on a wall of the cylindrically-shaped recess of the nut one or more projections and/or one or more recesses, and there is placed and secured within the said cylindrically-shaped recess an elastic inset consisting of one or more annular discs having a peripheral surface which forms a complete figure of revolution and which is preferably of true cylindrical form. Where a wall of the cylindrically-shaped recess is provided with projections, which may be formed on the axially-extending wall of such recess and/or on the end wall of such recess, for example, in the form of a series of teeth, the said projections are caused to penetrate into the annular disc or discs, whilst where recesses are formed in a wall of such recess, part of the annular disc or discs is forced into such recesses, in either case, relative rotary movement between the elastic inset and nut being cheaply and efficiently prevented.

In the manufacture of a preferred form of self-locking nut in accordance with the invention, the axially-extending wall of the cylindrically-shaped recess of the nut is suitably formed with one or more inwardly-extending projections, for example, by pressing inwardly the axially-extending wall of the nut, one or more annular discs of elastic material is or are forced into such recess, so that the said projection or projections is or are caused to penetrate into such annular disc or discs, and such annular disc or discs is or are retained in the nut, pressed one against the other in the case where a plurality of discs is employed, by clenching inwardly a border portion of the nut.

The invention will be further described with reference to the accompanying drawing, in which like reference numerals denote corresponding parts, and in which Figure 1 is a plan view of one form of nut blank;

Figure 1:
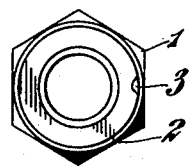
Figure 2:
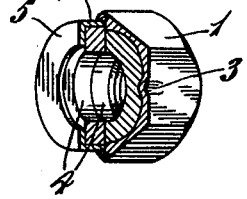
Figure 2 is a perspective view of a nut with part cut away, incorporating the nut blank shown in Figure 1.

Referring to Figures 1 and 2, the axially-extending wall 2 of the cylindrically-shaped recess of the nut 1 is formed with an inwardly-extending projection 3, and, as shown in Figure 2, the annular discs 4, whose peripheral surfaces are of true cylindrical form and which are inserted within the recess of the nut 1, are prevented from rotating relatively to the nut by the projection 3 which penetrates into each disc, and are retained in the nut, pressed one against the other, by the inwardly-turned border portion 5. If desired, the projection or projections 3 may be formed subsequently to the insertion within the nut blank of the elastic inset, by pressing inwardly the axially-extending wall 2 of the nut.

Figure 3:
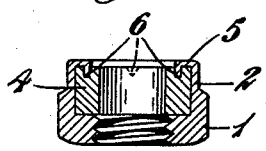
Figure 3 is a vertical central section of another form of nut.

Referring now to Figure 3, the elastic inset consists of a single annular disc or short tube 4, and the border portion 5 of the nut is provided with one or more projecting parts 6 or is formed with a toothed surface, such projecting part or parts or the projecting teeth being forced into an end wall of the annular disc or short tube 4 when such border portion is turned inwardly, thus preventing relative rotary movement between such disc or tube and the nut 1.

Figure 4:
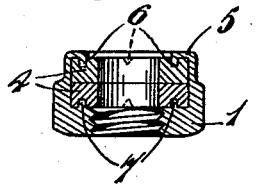
Figure 4 is a similar view of a further form of nut.
Figure 5:
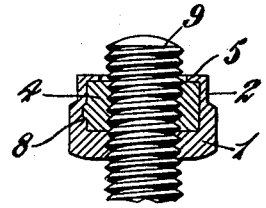
Figure 5 is a similar view of a still further form of nut, threaded on a screw.

In a further modification, the elastic inset consists of a plurality of annular discs, and projections are suitably formed on a wall or walls of the cylindrically-shaped recess so as to penetrate into each annular disc separately. For example, as shown in Figure 4, two annular discs 4 may be employed, the disc adjacent the screw-threaded portion of the nut 1 being secured by projections or teeth 7 extending axially from the end wall of the inset-receiving recess, the other disc being secured by turning inwardly the border portion 5 of the nut suitably formed with projections 6, as above described with reference to Figure 3.

Where the inset-contacting part of the wall of the cylindrically-shaped recess is formed with a recess or recesses, such recess or recesses is or are preferably formed in the axially-extending wall of the nut, part of the elastic inset being forced into such recess or recesses on screwing together the nut and a screw by expansion due to the insertion of the screw. For example, as shown in Figure 5, the wall 2 of the nut 1 is provided with a single recess 8, part of the annular disc 4 being forced into such recess when the nut is threaded on the screw 9.

It will be understood that any desired disposition of the projections and/or recesses may be employed in accordance with the invention to prevent relative rotary movement between the nut and the annular disc or discs, and that the invention is not limited to the particular arrangements described above and illustrated in the drawing.

Various forms of self-locking nuts, for example, anchor nuts, may be manufactured in accordance with the invention.

I claim:

1. The method of making a self-locking screw-threaded nut, which comprises forming in the nut a recess the walls of which form a complete figure of revolution, forming in the axially-extending wall of the said recess an inwardly-extending projection, and forcing within said recess in axial alignment an elastic inset which has a peripheral surface that forms a complete figure of revolution and which has a hole therein of less diameter than the maximum interior diameter of the screw-threaded portion of the nut.

2. The method of making a self-locking screw-threaded nut, which comprises forming in the nut a recess the walls of which form a complete figure of revolution, forming in the axially-extending wall of the said recess an inwardly-extending projection, and forcing within said recess in axial alignment an elastic inset comprising a plurality of annular discs each of which has a peripheral surface that forms a complete figure of revolution and each of which has a hole therein of less diameter than the maximum interior diameter of the screw-threaded portion of the nut, the said inwardly-extending projection being so formed as to penetrate into each of the said annular discs.

3. In the method of making a self-locking screw-threaded nut according to claim 2, clenching inwardly a border portion of the nut to retain the elastic inset within said recess.

4. The method of making a self-locking screw-threaded nut, which comprises forming in the nut a recess the walls of which form a complete figure of revolution, forming a projecting part on the inner end wall of the said recess, inserting within said recess in axial alignment an elastic inset which has a peripheral surface that forms a complete figure of revolution and which has a hole therein of less diameter than the maximum interior diameter of the screw-threaded portion of the nut, and turning inwardly the border portion of the nut to retain the said elastic inset within the said recess.

5. In the method of making a self-locking nut according to claim 4, forming a projecting part on the border portion of the nut and inserting within said recess two annular discs as the elastic inset.

6. A self-locking nut having a screw-threaded bore and a hole aligned with and of less diameter than the bore, said nut having a recess a wall of which forms a complete figure of revolution, an elastic inset having a peripheral surface forming a complete figure of revolution engaging the first-mentioned wall, and a means integral with the nut interlocked directly into said inset to prevent relative movement between the said inset and nut, said inset consisting of a plurality of discs, an inwardly extending border portion overlapping said inset, and said means comprising projections on the base wall of said recess and on said border portion.

7. The method of making a self-locking screw-threaded nut, which comprises forming in the nut a recess the walls of which form a complete figure of revolution, forming in the axially-extending wall of the said recess at least one inwardly-extending projection, forcing within said recess in axial alignment a non-metallic elastic inset which has a peripheral surface that forms a complete figure of revolution and which has a hole therein of less diameter than the maximum interior diameter of the screw-threaded portion of the nut, and clenching inwardly a border portion of the nut to retain the elastic inset within said recess.

8. The method of making a self-locking screw-threaded nut, which comprises forming in the nut a recess the walls of which form a complete figure of revolution, forming in a wall of said recess at least one inwardly-extending projection, and forcing within said recess in axial alignment a non-metallic elastic inset which has a peripheral surface that forms a complete figure of revolution and which has a hole therein of less diameter than the maximum interior diameter of the screw-threaded portion of the nut, to cause the projection to penetrate into said elastic inset.

9. A self-locking nut having a screw-threaded bore, a recess the walls of which form a complete figure of revolution, an elastic inset that is housed within said recess, that has a peripheral surface forming a complete figure of revolution and that has a hole therein in axial alignment with the said bore and of less diameter than the maximum interior diameter of said bore, and a projecting part on the base wall of said recess interlocked directly into said inset to prevent relative movement between the said inset and nut.

OLIVER EDWIN SIMMONDS.